(12) United States Patent
Egawa et al.

(10) Patent No.: US 7,436,872 B2
(45) Date of Patent: Oct. 14, 2008

(54) HIGH FREQUENCY DISCHARGE EXCITED GAS LASER OSCILLATOR

(75) Inventors: Akira Egawa, Shizuoka (JP); Minoru Ando, Yamanashi (JP); Hajime Ikemoto, Yamanashi (JP)

(73) Assignee: Fanuc Ltd, Minamitsura-gun, Yamanashi (JP)

( * ) Notice: Subject to any disclaimer, the term of this patent is extended or adjusted under 35 U.S.C. 154(b) by 0 days.

(21) Appl. No.: 11/467,029

(22) Filed: Aug. 24, 2006

(65) Prior Publication Data

US 2007/0047610 A1 Mar. 1, 2007

(30) Foreign Application Priority Data

Aug. 25, 2005 (JP) .............................. 2005-244220

(51) Int. Cl.
  *H01S 3/22* (2006.01)
  *H01S 3/00* (2006.01)
  *H01S 3/097* (2006.01)

(52) U.S. Cl. .................... 372/55; 372/38.04; 372/81

(58) Field of Classification Search ............ 372/29.021, 372/30, 34, 38.1, 38.02, 38.04, 38.07, 55, 372/57, 61, 81, 84
See application file for complete search history.

(56) References Cited

FOREIGN PATENT DOCUMENTS

| CN | 1253867 | 5/2000 |
|---|---|---|
| JP | 03-018075 | * 1/1991 |
| JP | 03-018075 A | 1/1991 |
| JP | 6-44653 B2 | 6/1994 |
| JP | 10-229233 A | 8/1998 |
| JP | 11-233862 A | 8/1999 |
| JP | 2000-126879 A | 5/2000 |

OTHER PUBLICATIONS

Notice of Reasons for Rejection dated Jun. 26, 2007 from JPO regarding JP Patent Application No. 2005-244220 (Partial translation).
Notification of the first Office Action dated Oct. 19, 2007, regarding Chinese Patent Application No. 200610121838.1.

* cited by examiner

*Primary Examiner*—Armando Rodriguez
(74) *Attorney, Agent, or Firm*—Lowe, Hauptman, Ham & Berner, LLP

(57) ABSTRACT

A high-frequency discharge excited gas laser oscillator receiving power from a laser power supply controlled by a pulse command, the high-frequency discharge excited gas laser oscillator provided with a power detecting section for detecting supply power from the laser power supply to a discharge tube and a pulse command control section positioned at an upstream side of the laser power supply, comparing an allowable upper limit value of supply power found from a relationship between a discharge tube temperature and supply power and an actual supply power detected by the power detecting section, stopping the pulse command value to the discharge tube when the supply power is higher than the allowable upper limit value, and setting a pulse command value based on the allowable upper limit value.

1 Claim, 4 Drawing Sheets

HIGH FREQUENCY DISCHARGE EXCITED GAS LASER OSCILLATOR

BACKGROUND OF THE INVENTION

Field of the Invention

In general, in laser processing using a high-frequency discharge excited gas laser oscillator, when high-quality drilling or cutting processing are performed, a laser beam with a pulse output controlled by a pulse command is used for the processing. This is because, as clear from the relationship between the discharge tube temperature and peak output command value shown in FIG. 4, the peak output value can be made higher at the time of a pulse output command rather than a CW output command. That is, the temperature T at which a discharge tube breaks rises along with an increase in the peak output value, but compared with the average output at the time of a CW output command (line A), the average output at the time of a pulse output command (line B) becomes smaller, the temperature rise of the discharge tube is small, and the peak output command value Pb at the time of a pulse output command at the temperature T which the discharge tube breaks can be made higher than the peak output command value Pa at the time of a CW output command.

On the other hand, if the peak output command value becomes higher and exceeds the breakdown temperature T of the discharge tube, the laser power supply's MOSFETs and other power elements will be destroyed due to the excessive power or the high heat will destroy the discharge tube. For this reason, the peak output command value is limited by the capacity of the laser power supply driving the discharge tube and the power resistance of the discharge tube.

Conventional examples of devices for controlling the pulse output command value in high-frequency discharge excited gas laser oscillators are described in Japanese Examined Patent Publication (B2) No. 6-44653 (JP-B-6-44653), Japanese Unexamined Patent Publication (A) No. 11-233862 (JP-A-11-233862), Japanese Unexamined Patent Publication (A) No. 10-229233 (JP-A-10-233862), and Japanese Unexamined Patent Publication (A) No. 2000-126879 (JP-A-2000-126879).

Japanese Examined Patent Publication (B2) No. 6-44653 discloses a laser controller configured to independently control the average output value and peak output command value of a pulse, facilitating adjustment of the pulse output in accordance with the processing conditions, and thereby enabling stable laser processing.

Japanese Unexamined Patent Publication (A) No. 11-233862 discloses a laser power supply provided with a current detecting means provided between a RF inverter for converting a direct current to a high-frequency alternating current and a laser oscillator, a control means for comparing the detected current and a waveform defining a current limiting operation point (a triangle waveform), and a pulse width modulation circuit for reducing the pulse width when the waveform reaches the current limiting operation point and reducing the current to protect the power supply at the time of overload.

Japanese Unexamined Patent Publication (A) No. 10-229233 discloses a laser power supply device provided with a means for setting a limiter curve for avoiding the problem of heat generation of elements etc. from the relationship between the pulse waveform time interval and output command value at the time of a pulse command, a means for rearranging the each of pulse elements obtained from the pulse waveform, a means for estimating if the pulse elements are inside the limiter curve, and a means for correcting the pulse waveform so that the pulse element falls within the limiter curve and able to quickly and effectively correct a pulse waveform.

Japanese Unexamined Patent Publication (A) No. 2000-126879 discloses a laser processing system provided with a means using a conversion table setting a relationship between a pulse width command and peak output command to change a pulse width and a means for correcting the pulse width based on the set value and able to control a pulse output to be constant.

However, the devices disclosed in Japanese Examined Patent Publication (B2) No. 6-44653 and Japanese Unexamined Patent Publication (A) No. 11-233862 reduce the pulse width etc. to hold the pulse output constant when the processing conditions etc. change, but do not provide technology for raising the pulse output.

The device disclosed in Japanese Unexamined Patent Publication (A) No. 10-229233 has difficulty setting an accurate limiter curve by just the time interval of the pulse command and an output command value for various pulse command conditions such as the frequency or duty as a pulse command, solid difference of the laser, etc. In actuality, it is necessary to set the limiter curve with a considerable margin. Therefore, the pulse output tends to be set lower than the actual upper limit value and there was a limit to raising the pulse output. Further, the limiter curve is set using a processing means, so there was also the problem that the hardware configuration became complicated.

The processing system disclosed in Japanese Unexamined Patent Publication (A) No. 2000-126879 has difficulty setting an accurate conversion table by just the time interval of the pulse command and output command value for various pulse command conditions such as the frequency or duty of the pulse command, solid difference of the laser, etc. In actuality, it is necessary to set the conversion table with a considerable margin. For this reason, the pulse output depends on the precision of the conversion table and there was a limit in bringing the pulse output to get close the upper limit value. Further, the precision of the pulse output depends on the performance of the detector. In the case of a fast response detector, there was therefore the difficulty of a higher cost. Since a conversion table or other processing means is used, there was the problem that the hardware configuration became complicated.

SUMMARY OF THE INVENTION

An object of the present invention, in consideration of the above situation, is to provide a high-frequency discharge excited gas laser oscillator free from breakage of the discharge tube and other parts due to high heat and making effective use of a higher command value than a conventional maximum output command value so as to raise the laser output at the time of a pulse command by a relatively simple configuration.

To achieve this object, according to a first aspect of the present invention, there is provided a high-frequency discharge excited gas laser oscillator receiving power from a laser power supply controlled by a pulse command, the high-frequency discharge excited gas laser oscillator provided with a power detecting section for detecting supply power from the laser power supply to a discharge tube and a pulse command control section positioned at an upstream side of the laser power supply comparing an allowable upper limit value of supply power found from a relationship between a discharge tube temperature and supply power and an actual supply power detected by the power detecting section, stopping the pulse command value to the discharge tube when the supply power is higher than the allowable upper limit value, and setting a pulse command value based on the allowable upper limit value.

According to this embodiment of the present invention, by using the power detecting section to detect the power supplied by the laser power supply to the discharge tube, using the pulse command control section to stop the pulse command value to the discharge tube when the actual supply power is higher than the allowable upper limit value, and setting the pulse command value based on the allowable upper limit value, it is possible to raise the pulse output up to the limit beyond which the breakdown temperature of the discharge tube is exceeded. Therefore, it is possible to prevent the discharge tube and other parts from being damaged due to high heat and make effective use of a higher command value than a conventional maximum output command value so as to increase the laser output at the time of a pulse command by a relatively simple configuration.

Further, another embodiment of the present invention provides a high-frequency discharge excited gas laser oscillator, wherein the laser power supply is provided with a DC power unit and a high-frequency power unit positioned at the downstream side of the DC power unit and wherein the power detecting section detects power supplied from the DC power unit to the high-frequency power unit.

According to this embodiment of the present invention, it is possible to detect the power supplied from the DC power unit to the high-frequency power unit and therefore keep the detection circuit lower in operating frequency and operating voltage compared with the case of detecting the supply power from the high-frequency power unit and configure the power detecting section more easily.

BRIEF DESCRIPTION OF THE DRAWINGS

These and other objects and features of the present invention will become clearer from the following description of the preferred embodiments given with reference to the attached drawings, wherein.

DETAILED DESCRIPTION

Figure 1:
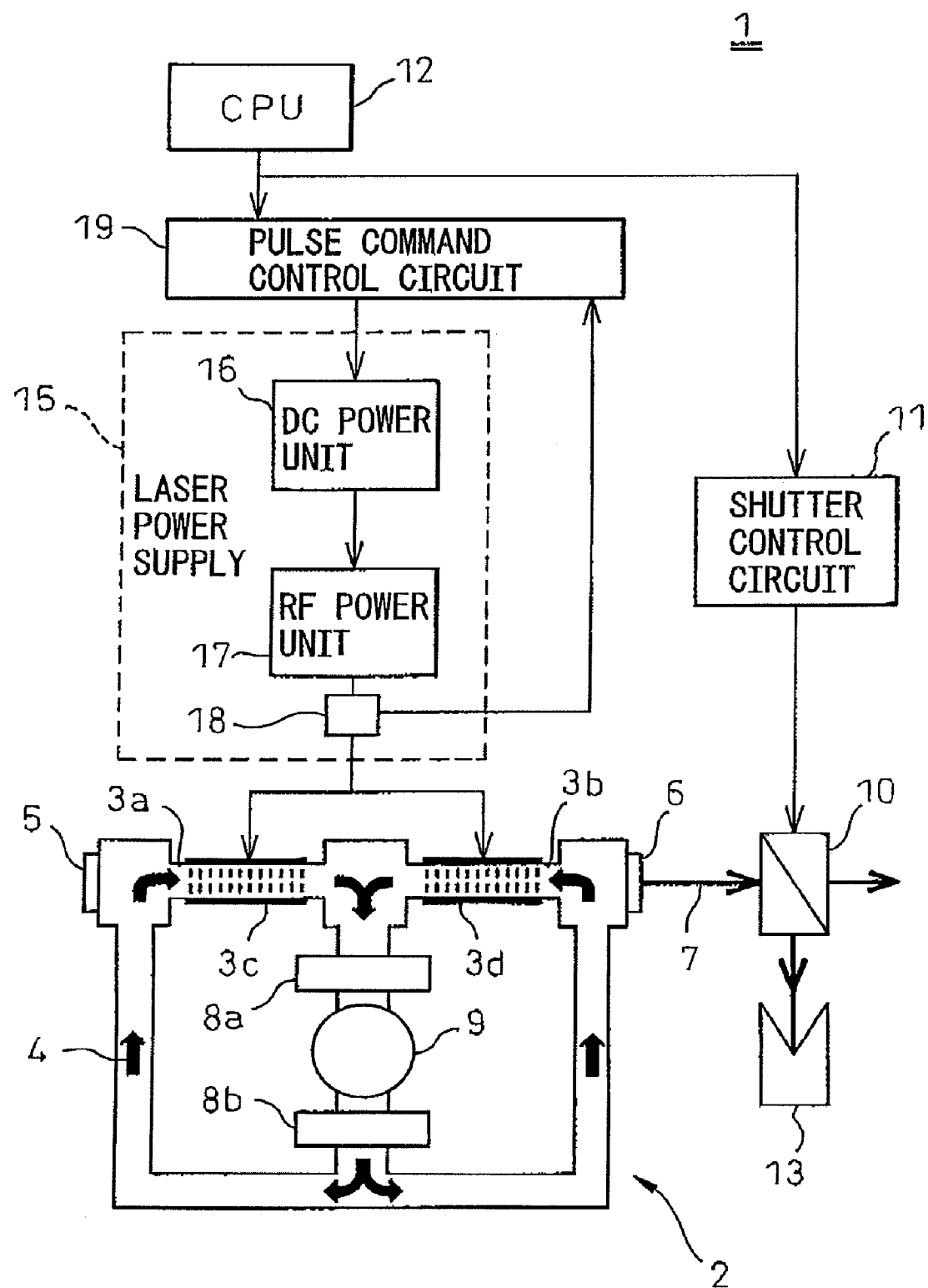
FIG. 1 is a view of the configuration of a high-frequency discharge excited gas laser oscillator according to a first embodiment of the present invention.

Preferred embodiments of the present invention will be described in detail below while referring to the attached figures. FIG. 1 shows a high-frequency discharge excited gas laser oscillator according to a first embodiment of the present invention.

As shown in FIG. 1, the high-frequency discharge excited gas laser oscillator 1 of the present embodiment is provided with an oscillator body 2, a laser power supply 15 for supplying power to discharge tubes 3a, 3b exciting a laser beam 7 by discharge, an RF power detection circuit (a power detecting section) 18 for detecting supply power from the laser power supply 15 to the discharge tubes 3a, 3b, and a pulse command control circuit (pulse command control section) 19 for controlling a pulse command value to the discharge tubes 3a, 3b, finding an allowable upper limit value W of supply power from a relationship of a discharge tube temperature and supply power (see FIG. 2), comparing this allowable upper limit value W and the detected actual supply power, and controlling the pulse output command value to the discharge tubes 3a, 3b so that the actual supply power does not exceed the allowable upper limit value W.

Figure 2:
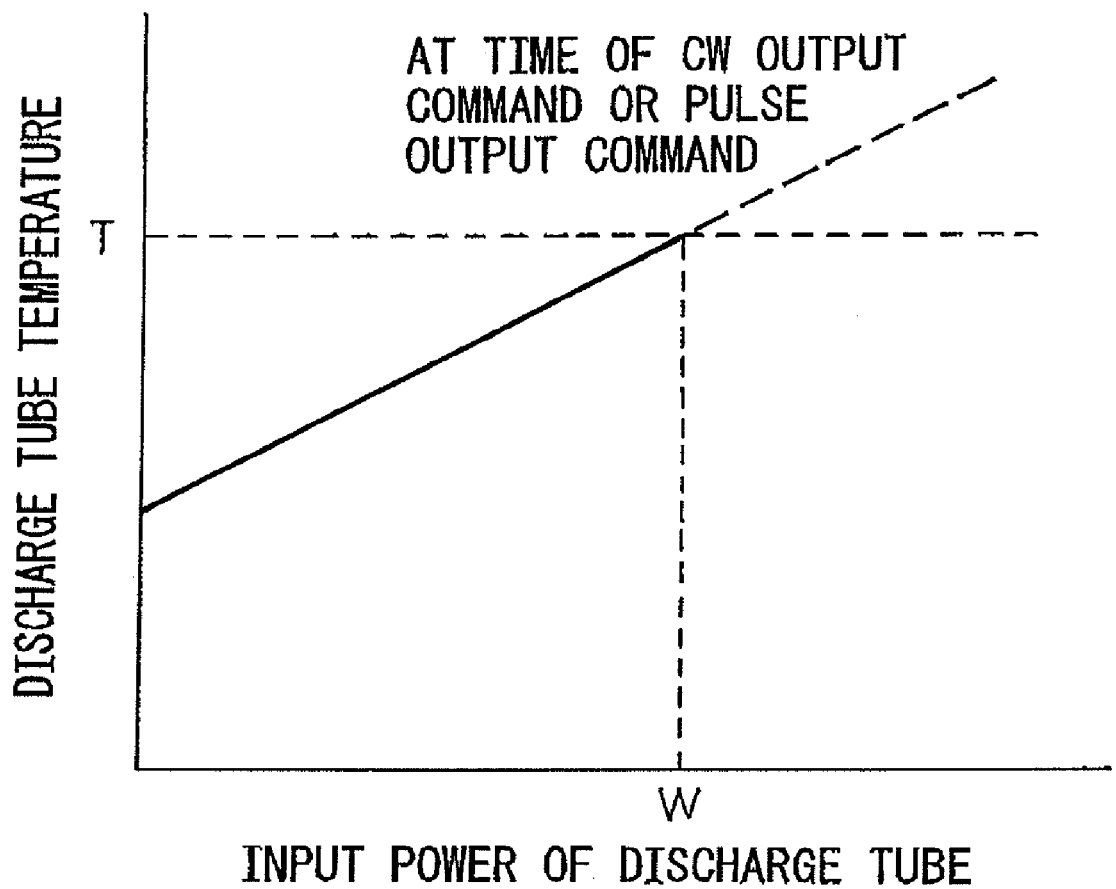
FIG. 2 is a view of the relationship between a discharge tube temperature and a supply power.

FIG. 2 shows the relationship between the discharge tube temperature and the power supplied to the discharge tubes 3a, 3b. This figure shows that the discharge tube breakdown temperature T is dependent on the supply power and is not dependent on a oscillation mode. That is, the temperature characteristic is the same both at the time of a CW output command and at the time of a pulse output command. Further, it becomes the same temperature characteristic regardless of the pulse output command value, frequency, duty (a ratio of on-state to one operation), or other various command conditions. This means that the supply power W when reaching the breakdown temperature T of the discharges tube 3a, 3b becomes constant without regard as to the command conditions.

Therefore, at the time of a pulse command, by detecting the power supplied from the laser power supply 15 to the discharge tubes 3a, 3b and keeping the pulse output command value, it is possible to prevent the discharge tubes 3a, 3b and other parts from being destroyed or damaged. When keeping the pulse output command value, by setting the pulse command value based on the allowable upper limit value W, without requiring any complicated configuration, it is possible to make effective use of a higher command value than a conventional maximum output command value and thereby raise the laser output.

The configuration of the high frequency discharge excited gas laser oscillator 1 according to the present embodiment will be explained next. As shown in FIG. 1, the oscillator body 2 has a not shown laser gas control system and two discharge tubes 3a, 3b receiving the supply of laser gas 4 from the laser gas control system. The laser gas control system supplies laser gas 4 to the discharge tubes 3a, 3b and discharges laser gas 4 from the discharge tubes 3a, 3b.

The discharge tubes 3a, 3b have a pair of discharge tubes 3c, 3d arranged at their outsides so as to sandwich in the discharge tubes 3a, 3b and are arranged inside the optical resonator. As the discharge tubes 3c, 3d, ones of the same dimensions but suitably coated are preferably used. The discharge tubes 3c, 3d are connected to the laser power supply 15. High-frequency current corresponding to the current command value from the pulse command control circuit 19 is supplied to the discharge tubes 3a, 3b.

The oscillator body 2 is provided at one end with a rear mirror (resonator internal mirror) 5 not having any partial transmittance and is provided at Its other end with an output mirror 6. The rear mirror 5 is a germanium mirror with a reflectance of 99.5%, while the output mirror 6 is a zinc-selenium mirror with a reflectance of 65%. The two mirrors 5, 6 form a stable resonator which amplifies the 10.6 μm light emitted from the excited laser gas molecules and outputs part from the output mirror 6 as a laser beam 7 to the outside.

The oscillator body 2 is provided inside it with a turboblower as a blower 9 for circulating the laser gas 4 through the coolers 8a, 8b. The cooler 8a is for cooling the laser gas 4 becoming a high temperature due to the electrodischarge, while the cooler 8b is for eliminating the heat of compression due to the blower 9.

Further, the oscillator body 2 has a shutter 10. The shutter 10 is comprised of a copper plate with a gold plated surface.

The shutter 10 opens and closes based on a command of the processor 12 through the shutter control circuit 11. When the shutter 10 is closed, it reflects the laser beam 7 output from the output mirror 6. The reflected laser beam 7 is absorbed by the beam absorber 13. Further, when the shutter 10 is open, the laser beam 7 is output to the outside of the laser oscillator 1.

The laser power supply 15 is comprised of a DC power unit (direct current power unit) 16 and an RF power unit (high-frequency power unit) 17. The DC power unit 16 rectifies electric current supplied from the commercial power, then performs a switching operation and converts it to a direct current. The RF power unit 17 converts the direct current to a 2 MHz high-frequency alternating current and supplies a high-frequency current to the discharge tubes 3a, 3b based on the pulse output command from the pulse command control circuit 19. Inside the discharge tubes 3a, 3b, a laser gas 4 circulates. By the laser power supply 15 applying a high-frequency voltage, the laser gas 4 is excited.

The RF power detection circuit 18 is provided between the RF power unit 17 and the discharge tubes 3a, 3b inside the laser power supply 15 and monitors the supply power of the discharge tubes 3a, 3b. The RF power detection circuit 18 converts the high-frequency power to a low voltage and feeds back the power monitoring values of the discharge tubes 3a, 3b to the pulse command control circuit 19. This RF power detection circuit 18 is comprised of a multiplication circuit multiplying the output voltage value and output current value of the RF power unit 17. Note that a similar effect can be obtained by separating detecting the power monitoring values of the output voltage and output current of the RF power unit 17, feeding them back to the pulse command control circuit 19 or CPU 12, multiplying them, and converting the result to a power monitoring value.

The pulse command control circuit 19 is arranged between the laser power supply 15 and the CPU 12 and receives commands from the CPU 12 for controlling the laser power supply 15. The pulse command control circuit 19 processes the power monitoring value detected by the RF power detection circuit 18, and compares the processed power monitoring value and the allowable upper limit value W of the supply power found from the relationship of the discharge tube temperature and supply power shown in FIG. 2. When the power monitoring value becomes the allowable upper limit value W or more, keeps the current command value to the discharge tubes 3a, 3b and outputs a pulse output command based on the allowable upper limit value W instead of the power monitoring value.

For this reason, the supply of power from the laser power supply 15 to the discharge tubes 3a, 3b causing the discharge tube temperature to exceed the breakdown temperature can be prevented, the laser output can be raised up to the limit of the discharge tube breakdown temperature T, and high grade, high efficiency processing becomes possible.

Figure 3:
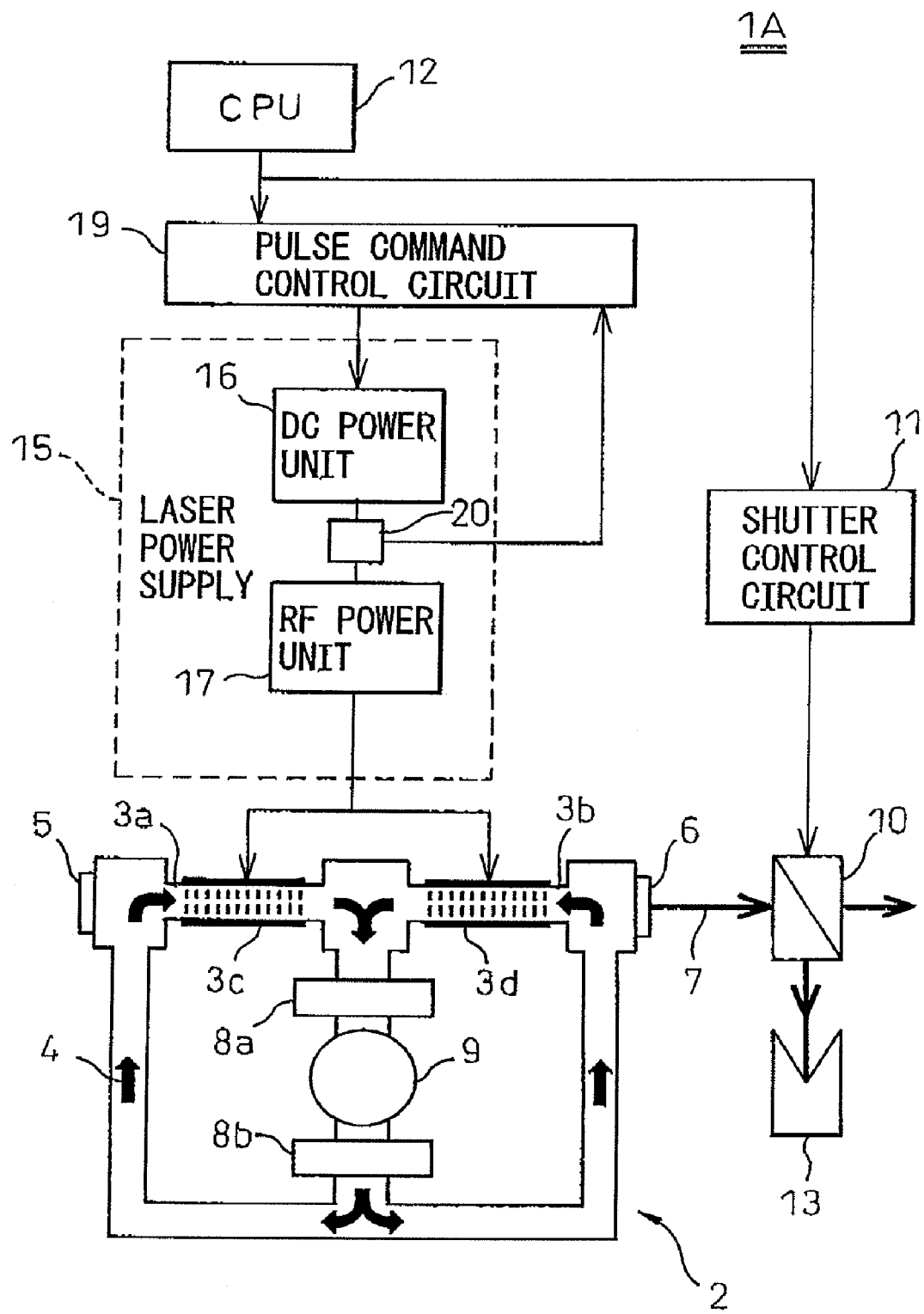
FIG. 3 is a view of the configuration of a high-frequency discharge excited gas laser oscillator according to a second embodiment of the present invention.
Figure 4:
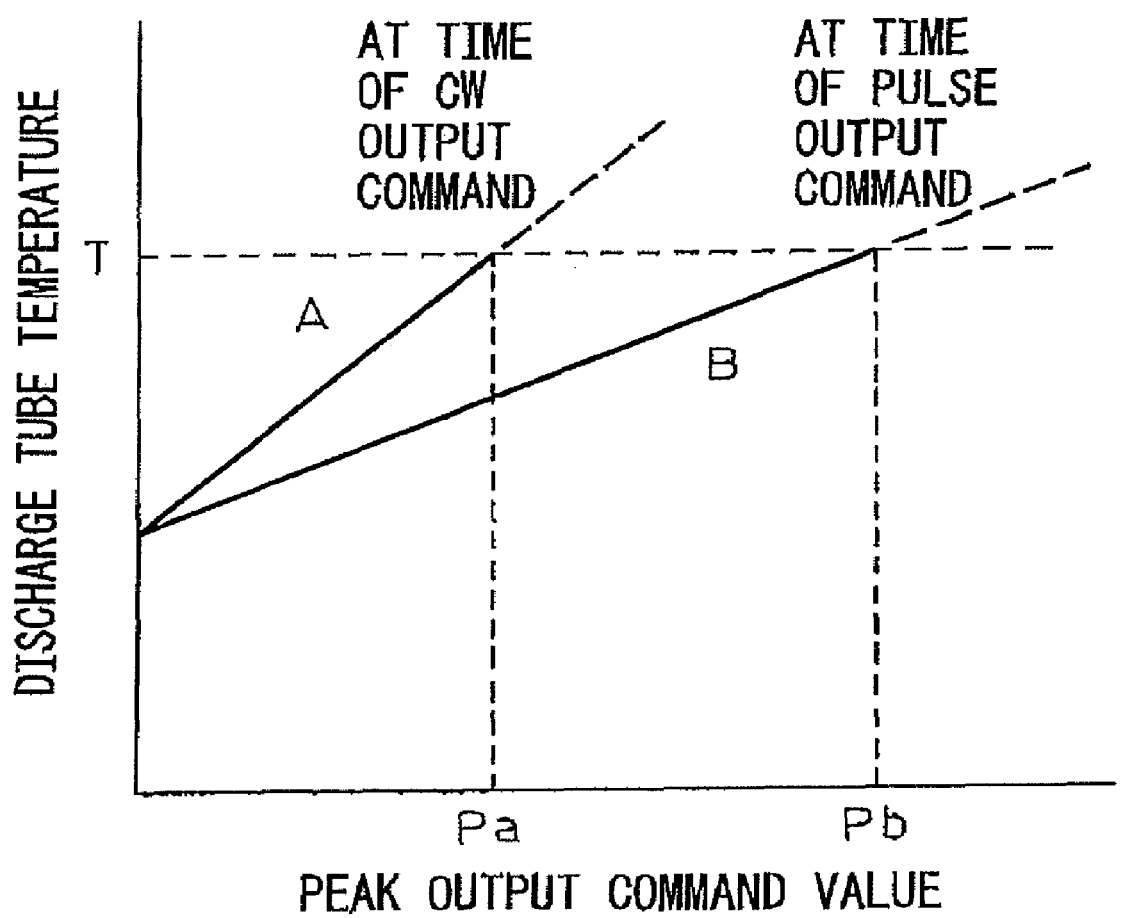
FIG. 4 is a view of the relationship between a discharge tube temperature and a peak output command value.

Next, based on FIG. 3, a high frequency discharge excited gas laser oscillator according to a second embodiment of the present invention 1A will be explained. The present embodiment provides the DC power detection circuit 20 between the DC power unit 16 and RF power unit 17. On this point, it differs from the first embodiment which provides the RF power detection circuit 18 at the downstream side of the RF power unit 17. Note that the parts in the present embodiment the same as those in the first embodiment are assigned the same reference notations and explanations therefore are omitted.

The DC power detection circuit 20 detects the supply power from the DC power unit 16 to the discharge tubes 3a, 3b and feeds back the power monitoring value to the pulse command control circuit 19. The pulse command control circuit 19 processes the power monitoring value detected by the DC power detection circuit 20, compares the processed power monitoring value and the allowable upper limit value W of the supply power found from the relationship between the discharge tube temperature and supply power shown in FIG. 2, and keeps the current command to the discharge tubes 3a, 3b. When the power monitoring value is the allowable upper limit value W or more, and outputs a pulse output command based on the allowable upper limit value W instead of the power monitoring value.

The DC power is lower than RF power in operating frequency and operating voltage, so there is the advantage that the power detection circuit 20 can be easily configured. Further, the DC power detection circuit 20 is comprised of a multiplication circuit for multiplying the output voltage value and output current value of the DC power unit 16, but similar effects are obtained even if detecting the power monitoring values of the output voltage and output current of the DC power unit 16, feeding these back to the pulse command control circuit 19 or CPU 12, then performing the multiplication and converting to the power monitoring value.

In the above way, according to the first and second embodiments, by high heat, the discharge tubes 3a, 3b and other parts can be prevented from damage, and by a higher command value than a conventional maximum output command value, a pulse output value can be used effectively to raise up to a limit not exceeding the breakdown temperature T of the discharge tubes 3a, 3b by a relatively simple configuration. Due to this, high grade, high efficiency processing can be stably performed.

While the invention has been described with reference to specific embodiments chosen for purpose of illustration, it should be apparent that numerous modifications could be made thereto by those skilled in the art without departing from the basic concept and scope of the invention.

The invention claimed is:

1. A radio frequency (RF) discharge excited gas laser oscillator receiving power from a laser power supply controlled by a pulse command, the laser power supply having a DC power unit and a RF power unit positioned at a downstream side of said DC power unit, said RF discharge excited gas laser oscillator comprising:
   a power detecting section for detecting supply power supplied from said DC power unit to said RF power unit; and
   a pulse command control section positioned at an upstream side of said DC power unit, the pulse command control section comparing an upper limit value of supply power determined from a relationship between a discharge tube temperature and supply power and an actual supply power detected by said power detecting section, stopping the pulse command value to said discharge tube when said supply power is higher than said determined upper limit value, and setting a pulse command value based on said determined upper limit value.

* * * * *